United States Patent
Hinton et al.

(10) Patent No.: US 8,320,882 B2
(45) Date of Patent: Nov. 27, 2012

(54) METHOD AND APPARATUS FOR MANAGING OBFUSCATED MOBILE DEVICE USER IDENTITIES

(75) Inventors: Heather Maria Hinton, Austin, TX (US); Alastair John Angwin, Eastleigh (GB); Mark Pozefsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1047 days.

(21) Appl. No.: 11/752,962

(22) Filed: May 24, 2007

(65) Prior Publication Data
US 2008/0293411 A1 Nov. 27, 2008

(51) Int. Cl.
*H04M 3/16* (2006.01)
(52) U.S. Cl. ............ 455/411; 455/410; 455/435.1; 455/432.1; 726/5; 726/7; 380/247
(58) Field of Classification Search ............ 455/410, 455/411, 435.1, 414.1, 432.1; 370/338; 726/1–7, 726/21, 26–29; 380/247–248
See application file for complete search history.

(56) References Cited

U.S. PATENT DOCUMENTS

| | | | | |
|---|---|---|---|---|
| 6,373,949 | B1 * | 4/2002 | Aura | 380/247 |
| 6,708,033 | B1 | 3/2004 | Linkola | |
| 7,386,302 | B2 | 6/2008 | Riffe | |
| 2001/0012297 | A1 * | 8/2001 | Hrastar et al. | 370/401 |
| 2002/0197991 | A1 * | 12/2002 | Anvekar et al. | 455/432 |
| 2003/0220978 | A1 | 11/2003 | Rhodes | |
| 2004/0098620 | A1 | 5/2004 | Shay | |
| 2005/0043041 | A1 * | 2/2005 | Ignatius et al. | 455/456.2 |
| 2005/0160289 | A1 | 7/2005 | Shay | |
| 2005/0215233 | A1 * | 9/2005 | Perera et al. | 455/411 |
| 2009/0298500 | A1 * | 12/2009 | Beckmann et al. | 455/435.1 |

FOREIGN PATENT DOCUMENTS

WO WO 2005004511 1/2005

OTHER PUBLICATIONS

ATENIESE, "Untraceable Mobility or How to Travel Incognito", Jan. 14, 1999.

* cited by examiner

*Primary Examiner* — Marcos Torres
(74) *Attorney, Agent, or Firm* — Jeffrey S. LaBaw; David H. Judson

(57) ABSTRACT

A mobile device identifier (such as an MSISDN) that typically accompanies a mobile device request is replaced with an "enriched" identifier that exposes the mobile device user's home operator but obfuscates the mobile device's (and, thus, the device user's) identity. In one embodiment, the identifier comprises a first part, and a second part. The first part comprises a data string that identifies (either directly or through a database lookup) the mobile device user's home operator. The second part, however, is an opaque data string, such as a one-time-use unique identifier (UID) or a value that is otherwise derived as a function of the MSISDN (or the like). The opaque data string encodes the mobile device's identity in a manner that preferably can be recovered only by the user's home operator. The present invention describes a method and apparatus for use in a home network to manage the generation, storage and use of the unique identifiers.

23 Claims, 5 Drawing Sheets

METHOD AND APPARATUS FOR MANAGING OBFUSCATED MOBILE DEVICE USER IDENTITIES

CROSS-REFERENCE TO RELATED APPLICATIONS

This application is related to the following applications:

Ser. No. 11/752,988, filed May 24, 2007, titled "Method and apparatus for accessing a foreign network with an obfuscated mobile device user identity."

Ser. No. 11/752,944, filed May 24, 2007, titled "Mobile device having an obfuscated mobile device user identity."

BACKGROUND OF THE INVENTION

1. Technical Field

The present invention relates generally to maintaining privacy protections in a mobile networking environment.

2. Background of the Related Art

Within a mobile environment, a mobile device user typically is identified based on the device that he or she uses to access a mobile operator's network. With users demanding the ability to travel anywhere and still have mobile connectivity, mobile network operators have arranged to support "roaming" so that users have access to their home operator's services even if that operator does not provide any services in a particular coverage area. This is accomplished by allowing the user's mobile device to access the "foreign" network to which the device has roamed.

Typically, a network operator identifies the mobile device user by adding a tag of information, such as the device telephone number (MSISDN) or similar identifier bound to the device/user, to the user's request for service. Thus, when the mobile device roams into the foreign network and requests service, the device typically passes its MSISDN or IMSI to the local service operator, who then can provide the requested service—albeit with knowledge of the user's identity (or, at the very least, knowledge of the user's mobile device identity). While identifying the user's home network operator, such identifiers also are bound to the user's mobile device and, thus, to the user.

Once connected to the foreign network and authenticated, the user can use his or her device to obtain a service. Using a mini browser, for example, the user can access a web site and obtain a piece of content. Because the mobile device request includes the device identifier, the third party content provider in theory has access to the user's permanent identifier (namely, the MSISDN or IMSI). As privacy and competitive concerns become more prevalent, network operators are no longer able to put these identifiers in the clear in the user's request. Indeed, some privacy advocates in Europe have indicated that inclusion of an MSISDN in a mobile service request implicates privacy laws, and there have even been suggestions that such identifiers be removed from the network layer entirely. These issues are leading many network operators to consider alternatives, for example, such as completely removing the identifier from the user's request. While such a solution avoids privacy complications, it, in turn, introduces other complexities, as it is no longer possible for even the foreign network operator to identify either the user or the user's home operator.

The inclusion of device identifiers in mobile service requests also enables any entity having access to that data to build up a profile of the mobile device. Theoretically, this profile could be mapped to the mobile device user, which may be undesirable.

BRIEF SUMMARY OF THE INVENTION

According to an aspect of the present invention, a mobile device identifier (such as an MSISDN, or other like identifier) that typically accompanies a mobile device request is replaced (or at least supplemented) with a new "enriched" identifier that exposes the mobile device user's home operator but obfuscates the mobile device's (and, thus, the device user's) identity. In one embodiment, the enriched identifier comprises a first part, and a second part. The first part comprises a data string that identifies (either directly or through a database lookup) the mobile device user's home operator. The second part is an opaque data string, such as a one-time-use unique identifier (UID) or a value that is otherwise derived as a function of the MSISDN (or the like). Unlike the first part, which any given network may use to determine the identity of the operator's home network, the opaque data string encodes the mobile device's identity in a manner that preferably can be recovered only by the user's home operator (or an entity that is authorized thereby). The second part may be appended to the first part, or vice versa. Preferably, the second part is changed periodically (e.g., every few days) to enhance security.

In one embodiment, the unique identifier is set by a user's home network provider (HNP) and downloaded to the mobile device, preferably on a periodic basis. Initially, the HNP can set this value as part of a negotiation (between the device and the HNP) when the mobile device is registering with the HNP network. The HNP may even set the value when the user is roaming, e.g., using an application that is downloaded to the mobile device and that communicates with the HNP using a secure channel.

In another embodiment, the mobile device itself generates the enriched identifier. This option may be sufficient in scenarios where the device is roaming and off the HNP network for extended time periods.

In one use scenario, when the mobile device user roams into a foreign network and the device makes an initial request for service, the foreign network receives the enriched identifier, preferably in lieu of an identifier such as the MSISDN, or the like. The foreign network uses the first part to identify the mobile device user's home network, e.g., to determine whether to permit the requested access (or to provide some other value-added service). The foreign network, however, cannot decode the second part; thus, the mobile device's identity (as well as the identity of the mobile device user) remains obscured. The foreign network, however, is still able to offer services to the user, e.g., based on one or more permissions that are sent back to the foreign network provider (FNP) from the HNP (and, in particular, based on the HNP's internal mapping of the obfuscated value to the known MSISDN, or the like). This ensures that the user's privacy is maintained, while preventing third parties from building a profile of the device based on the requests that include the MSISDN, or the like.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
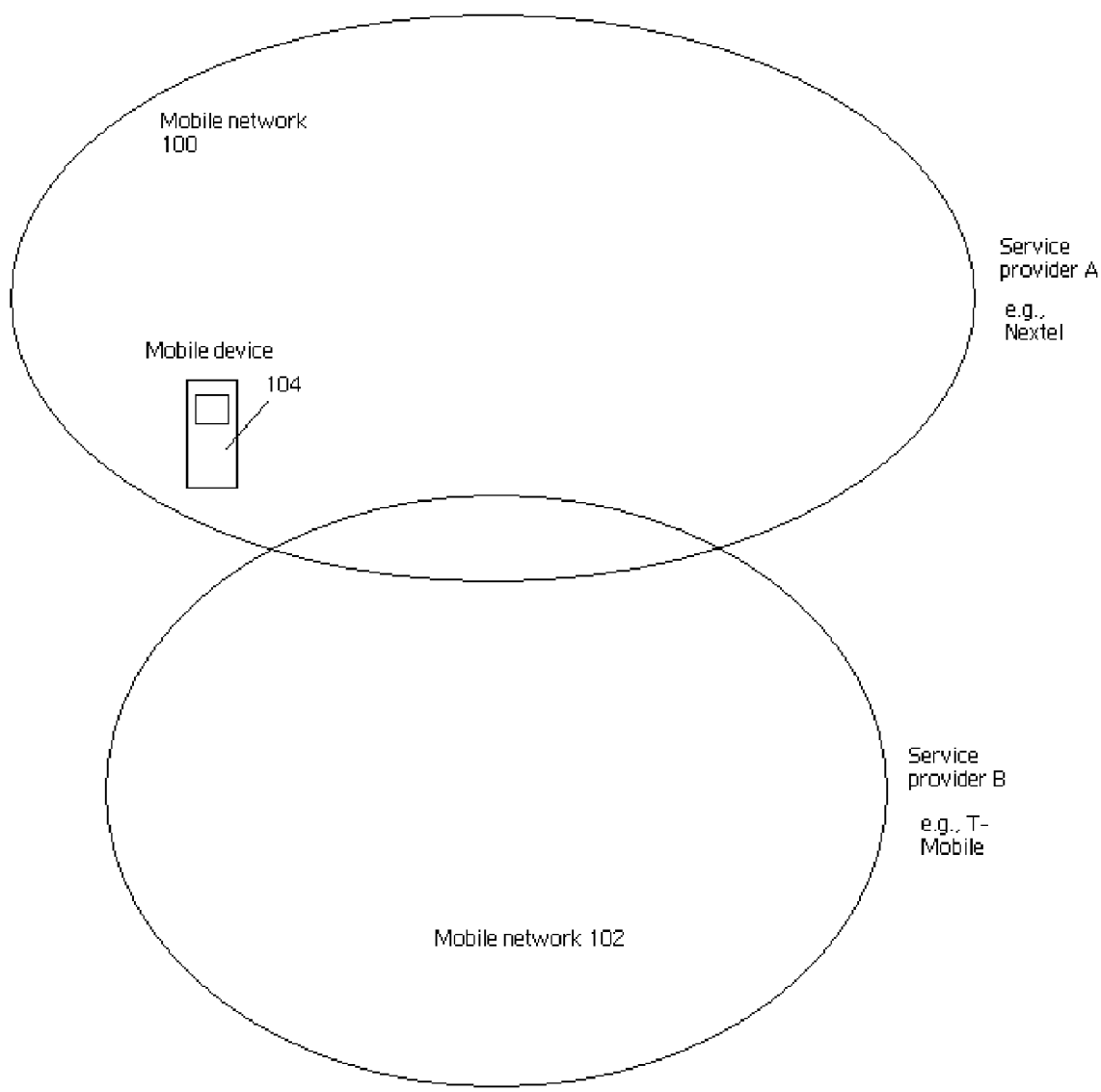
FIG. 1 is a wireless area network environment in which the present invention may be implemented.

FIG. 1 illustrates a wireless networking environment in which the present invention may be implemented. In this example, there are two (2) wireless networks illustrated, namely, wireless network 100 and wireless network 102. Each wireless network is a communication network that supports wireless communication using known technologies and protocols. A mobile device 104 associated with a mobile device user is useable in both networks. A "mobile device" is any wireless client device, such as a cell phone, a pager, a personal digital assistant, a mobile computer with a smart phone client, or the like. For wide area wireless communications, a typical mobile-enabled device supports wireless access protocols capable of sending and receiving data to and from a connected network in a wireless manner. Typically, mobile-enabled devices use graphical displays and can access the Internet (or other communication network) on so-called mini- or micro-browsers, which are web browsers with small file sizes that can accommodate the reduced memory constraints of handheld devices and the low-bandwidth constraints of a wireless networks. A typical mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known wireless data formats.

For purposes of explanation, it is assumed that the wireless networks 100 and 102 are maintained and operated by different network operators (sometimes referred to as service providers). A network operator is an entity that delivers services to one or more mobile device users, who access the operator's network with a wireless device. These services may include basic wireless service, as well as other value-added services. In FIG. 1, it is assumed that the mobile device user is a subscriber of wireless network 100 and, thus, with respect to the mobile device user network 100 is sometimes referred to herein as a "home network." The home network provider is sometimes referred to herein as an HNP. A "home network" is the network to which the mobile device user has a given relationship, typically, a contractual agreement to obtain one or more wireless service(s) in exchange for a service fee. The home network, as will be described, provides one or more functions (such as authentication, authorization, accounting, and the like) that are necessary to enable the mobile device user access and use the wireless service. Thus, e.g., if the mobile device user signs up for service with Nextel as the provider, Nextel's wireless network is considered to be the user's "home network." Any other (third party) network to which the mobile device user roams (such as network 102) is then considered to a "foreign network." The foreign network provider is sometimes referred to as an FNP. Of course, the ranges of the various wireless networks can overlap in coverage as indicated in FIG. 1. It should be appreciated that the designations "home" and "foreign" are merely provided by way of explanation and are not intended to limit the scope of the present invention.

Figure 2:
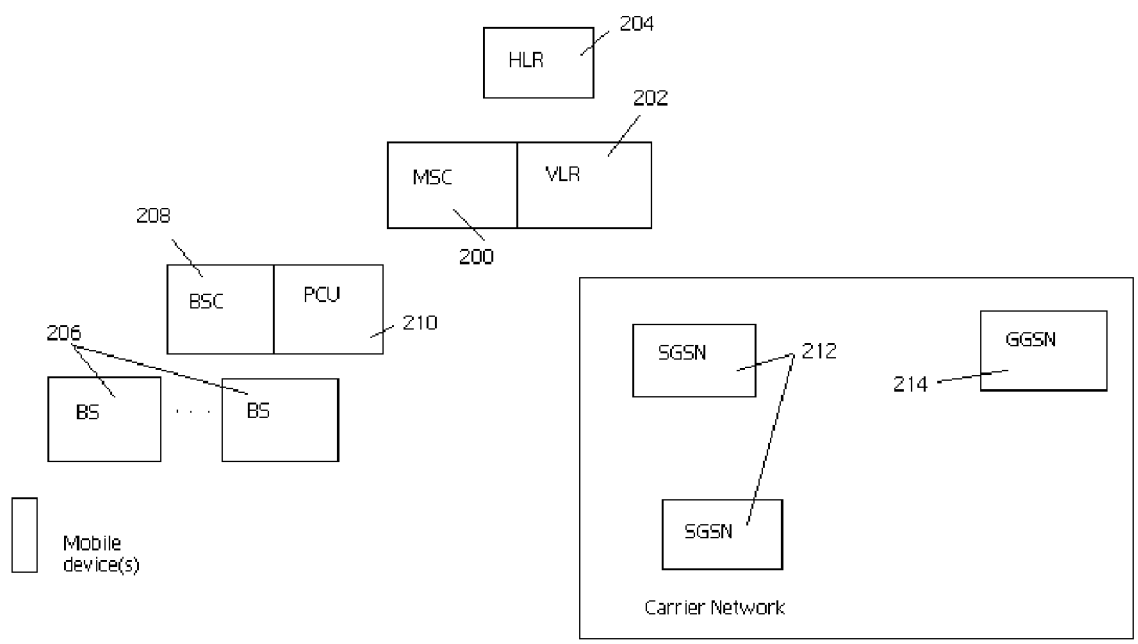
FIG. 2 is a representative wide area wireless network that may correspond to a mobile device user's home network, or a foreign network into which the mobile device may roam.

FIG. 2 illustrates a representative wireless network in more detail. This network may correspond either to home network 100 in FIG. 1, or to the foreign network 102. As will be discussed below, the present invention is not limited for use in wide area wireless networks of this type, but this will be the typical operating environment. In this example, the wireless network (e.g., a 2.5 G network) comprises one or more components such as: a mobile switching center 200 (MSC) (an enhanced ISDN switch that is responsible for call handling of mobile subscribers), a visitor location register 202 (VLR) (an intelligent database that stores on a temporary basis data required to handle calls set up or received by mobile devices registered with the VLR), a home location register 204 (HLR) (an intelligent database responsible for management of each subscriber's records), one or more base stations 206 (each a BS) (which provide radio coverage with a cell), a base station controller 208 (BSC) (a switch that acts as a local concentrator of traffic and provides local switching to effect handover between base stations), and a packet control unit 210 (PCU) (a device that separates data traffic coming from a mobile device). The HLR 204 also controls certain services associated with incoming calls. The mobile device is the physical equipment used by a subscriber. In a typical use scenario, the mobile device connects to a base station (BS). Multiple base stations connect into base station controller (BSC). The HLR 204 typically manages authentication and controls certain other services associated with incoming calls. Voice traffic is sent from the BSC to the mobile device. The PCU separates data traffic coming from the mobile device. Data (as opposed to voice) traffic is managed by the operator's wireless data network. Thus, for example, typically the data traffic goes to a Serving GPRS Service Node (SGSN) 212. A carrier's network of this type typically has multiple SGSNs. The SGSNs authenticate mobile users by querying the HLR. The SGSN 212 also manages data traffic, and it routes data traffic over the carrier's GPRS network to a Gateway GPRS Service Node (GGSN) 214. The GGSN 214 is a border router that routes traffic to and from the GPRS network into the public Internet. As a user moves across cells, the user becomes associated with different SGSNs. The SGSNs are responsible for managing the mobility of the user.

Figure 3:
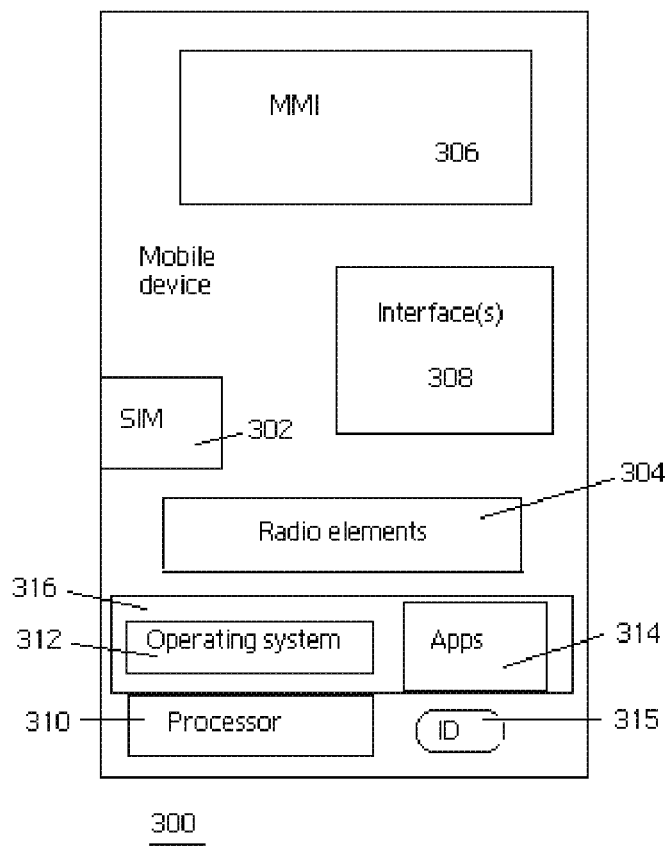
FIG. 3 is a block diagram of a representative mobile device.

Typically, a mobile device 300, such as seen in FIG. 3, includes a subscriber identity module 302 (SIM), which is a smart card that carries subscriber-specific information, mobile equipment 304 (e.g., radio and associated signal processing devices), a man-machine interface 306 (MMI), and one or more interfaces 308 to external devices (e.g., computers, PDAs, and the like). The mobile device also comprises a processor 310, an operating system 312, and one or more software applications 314, wherein, during use, the operating system 312 and applications 314 are supported in system memory 316. The present invention, as will now be described, preferably is implemented in software as one of the software applications 314.

Figure 4:
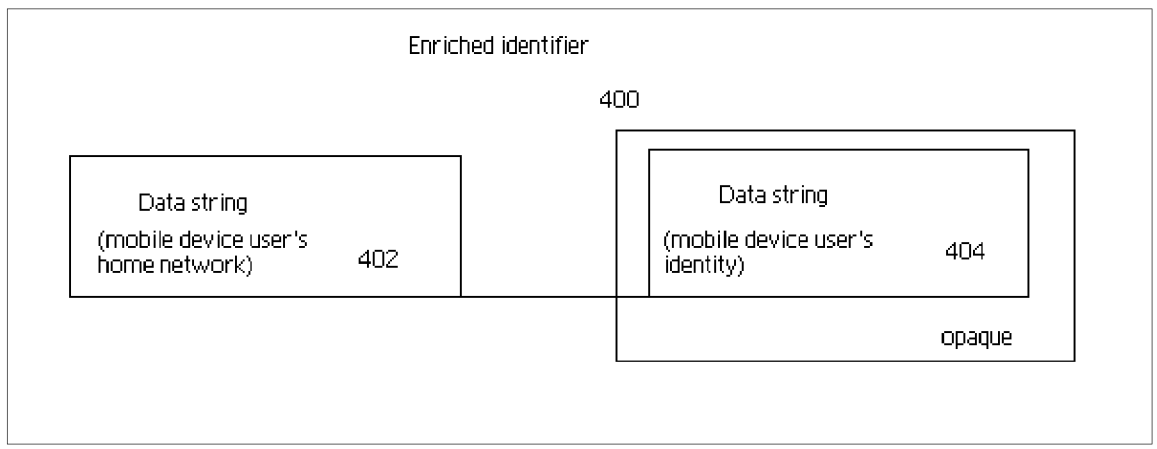
FIG. 4 is a first configuration of the enhanced identifier of the present invention.
Figure 5:
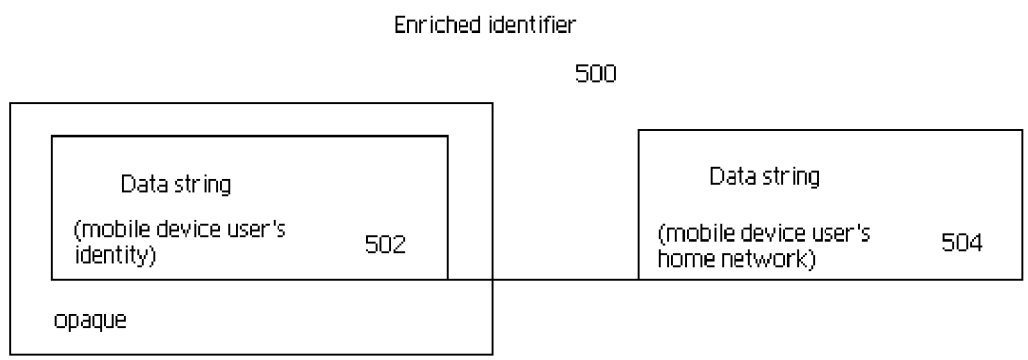
FIG. 5 illustrates a second configuration of the enhanced identifier.

According to the present invention, the mobile device identifier (such as an MSISDN, IMSI, or the like) that typically accompanies a mobile device request is replaced (or at least supplemented) with "enriched" identifier 315 (seen in FIG. 3) that exposes the mobile device user's home operator but obfuscates the mobile device's (and, thus, the device user's) identity. In one embodiment, as seen in FIG. 4, the enriched identifier 400 comprises a first part 402, and a second part 404. The first part 400 comprises a data string that identifies (either directly or through a database lookup) the mobile device user's home operator. The second part is an opaque data string, such as a unique identifier (UID). The UID may be a one-time-use identifier or, more likely, a limited time-use identifier that is guaranteed to be unique in some way in that it never gets regenerated when someone else gets a UID. The second part may be derived by applying a function to the MSISDN, or other identifier. Unlike the first part, which any given network may use to determine the identity of the operator's home network, the opaque data string encodes the mobile device's identity in a manner that preferably can be recovered only by the user's home operator (or an entity that is authorized thereby). The second part may be appended to the first part, or vice versa, such as illustrated in a second embodiment shown in FIG. 5. In either case, preferably the opaque portion of the enriched identifier is changed periodically to enhance security. Indeed, the enriched identifier may be change each time the device is turned on, periodically (such as every day, or every few days), or even on a more frequent basis during use.

Thus, by way of example, assume the mobile device user is a Nextel subscriber and that his or her device MSISDN is 1-555-345-1234. As is well-known, the MSISDN is a number that can be looked up by any operator and identified as a number that, in this example, belongs to Nextel and that Nextel knows belongs to the subscriber. According to the invention, the enriched identifier (in the form shown in FIG. 4) may be: 123456_4fac542fb, wherein the data string 123456 is a value that (either directly or by database lookup) evaluates as belonging to Nextel, and where only Nextel (or an entity associated therewith) can determine that a "4fac542fb" belongs to or otherwise identifies the subscriber in question. After a given time period (e.g., several days later), the enriched subscriber may be: 123456_5ca3b57c, where once again the value 123456 is readily determined to be associated with Nextel, whereas only Nextel (or a permitted entity) can determine that "5ca3b57c" again identifies the subscriber. With this approach, only Nextel can determine that user "4fac542fb" from two days prior is the same as "5ca3b57c" from today. These values, of course, are provided solely for explanation and are not intended to limit the present invention.

The mobile device includes UID-management software (e.g., a set of program instructions executable in a processor) for managing the enriched identifier, and for providing that identifier in association with a service request. In one embodiment, management of this identifier includes the bootstrapping of an initial UID value to the mobile device, the assertion of this value as part of a registration process with a roaming network, and the periodic update of this value (to prevent the building of a profile of an anonymous user, which may well eventually lead to the leaking of the user's real identity). The UID-management software may also be used to invoke a request to the HNP to obtain an opaque identifier, or a new opaque identifier. If desired, as part of the network access negotiation, the UID-management software may determine which network provider is being accessed and use a different UID for each different provider. Thus, more generally, the obfuscated portion may have several instances tied to a single device, where each different instance is provided for one and only one roaming provider.

As a typical embodiment, the initial bootstrap of an obfuscating UID may be added to the SIM card as part of the provisioning of the SIM card with a user's information (including the MSISDN). The management software may also be responsible for the requesting of the required UID on the very first registration of the mobile device to the home network. In this case, the UID management application will request a UID for the user, and store it at the mobile device. The management software may also store a timestamp like value to indicate the lifetime of this UID value, and to be used as a hint as to when the software should request a new UID value. Alternatively, the UID-management software may be programmed to request a new value on a periodic basis (e.g., weekly Monday 2 am EST).

As an alternative to having the UID-management periodically request a new UID value from an application at the HNP, the HNP may periodically update the UID value for each MSISDN, and push this value to the mobile device, where it is picked up by the UID management software and stored at the mobile device.

Figure 6:
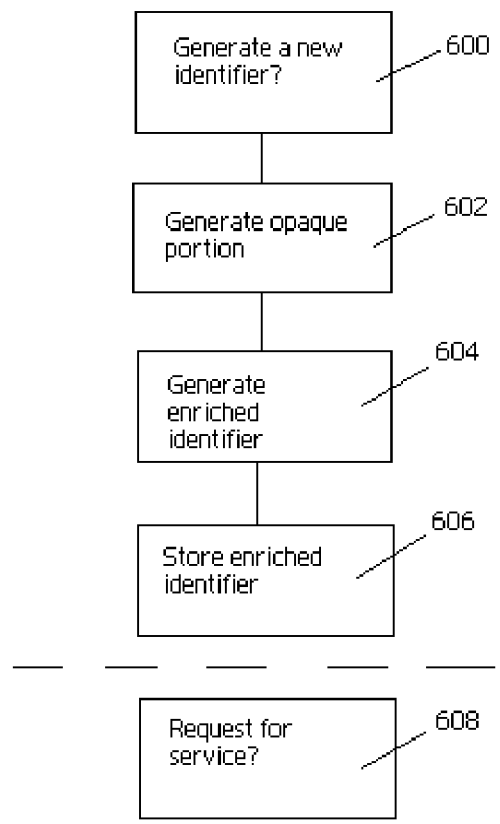
FIG. 6 is a process flow diagram illustrating how the enhanced identifier is generated and used at the mobile device.

A process flow diagram illustrating the mobile device based "pulling" of a UID from the associated HNP is shown in FIG. 6. The process executes in the mobile device as an application, process, execution thread or the like and begins at step 600 with a test to determine whether a new identifier is required. If not, the routine cycles. When step 600 is positive, the routine continues at step 602 with the processing required to obtain a new UID. As noted, step 602 may be implemented in any number of ways, including self-generation of a new UID at the mobile device, requesting of a new UID from a UID-management application at the HNP, or waiting for a UID to be received from the UID-management application at the HNP.

Thus, for example, one approach to generating a new UID at the mobile device is to obtain a unique identifier (e.g., a unique ID, UID, or even a universally unique ID, UUID) from a UID-management application at the mobile device. A UUID is guaranteed to be unique, whereas a UID need only be unique across the HNP. Another approach to generating the data string is to encrypt the MSISDN and a timestamp and some shared secret (or "salt", a value shared between the mobile device and the HNP, the purpose of which is to introduce extra uncertainty to the starting value for the purposes of expanding the solution space through which a brute force attack must be filtered). As one of ordinary skill will appreciate, any such mobile device-based obfuscation technique may be used provided that the user's service provider (or those authorized thereby) also have knowledge of the technique and can apply it or reverse it as needed to identify the user from the data string. Generally, of course, the computational resources associated with generating the UID are better maintained at the HNP as opposed to on the device, where they are subject to analysis and potential attack.

The mobile device UID-management software is responsible for generating the obfuscating UID (if this approach is used). In a preferred approach, however, the UID is generated by the HNP, not the device, in which case the UID-management software is responsible for interacting with the user's HNP to retrieve an HNP-based UID for storage at the mobile device. In one such embodiment, in step 602, the mobile device may query an application at the HNP for a UID (or even a UUID). The HNP will generate a new UID for the user/mobile device, and locally store a mapping of this value to the associated MSISDN. If the mobile device is on the home network, this retrieval can happen at any point, such as during device registration on power up, or at any time when the device determines that its currently stored UID is "stale." If, however, the mobile device is not on the home network (e.g., the user is roaming on a different network provider's network) then this specialized application at the mobile device may open a secure channel to an application at the home network to request a new UID. This latter value, when generated by the home network, then is returned to the mobile device, where it is stored and used as part of the registration process with foreign networks.

In yet another embodiment, the UID-management application at the HNP determines that a new UID value is required for a given MSISDN, generates a new UID, stores it locally (so that when it is presented by a roaming network, the local MSISDN can be recovered), and sends it to the mobile device, where it is stored by the mobile device UID-management application.

An advantage of the HNP-based UID generation approach is that the HNP can maintain all UID/MSISDN mapping values for compliance purposes. Thus, if required, the HNP can go back and prove that it generated the UID for the MSISDN and that the value was "valid," e.g., for a certain duration. This can be quite useful if there is a temporal collision of values, for example, the mobile device for 512-555-1234 generates 4fac542fb for a user, and then three weeks later, mobile device 212-555-4321 generates the same value (and uses this mobile device to engage in some nefarious act). If the HNP is responsible for generating the UID, it can a) ensure that no two values are reused for any of its users at any one time, and b) ensure that any cross-provider collisions can be resolved based on its audit logs).

Returning back to FIG. 6, the process continues at step 604 with the data string generated at step 602 appended or prepended (as the case may be) to a data string that identifies or can be used to identify the user's home network service provider as part of the registration process when the mobile device is attempting to register with a roaming network. Typically, this latter data string does not change over time and can be used by any operator to determine that the mobile device home operator is a given service provider (such as Nextel). If desired, the service provider portion of the enriched identifier can be varied periodically as well. The enriched identifier is stored at step 606.

At step 608, when a mobile device attempts to register with a foreign, or roaming network, the device will use this enriched identifier instead of the user's MSISDN as part of the registration process.

Figure 7:
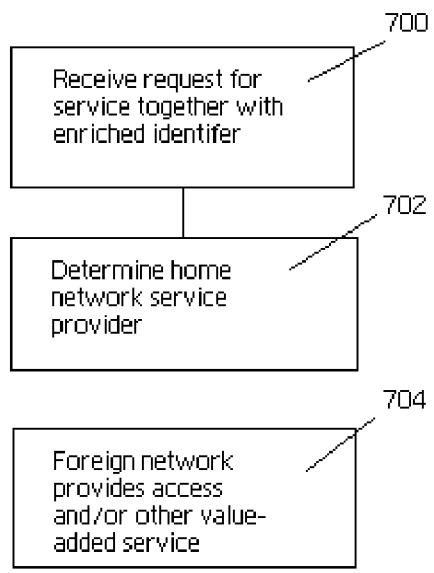
FIG. 7 is a process flow diagram illustrating how a service provider uses the enhanced identifier.

Thus, when the mobile device user roams into a foreign network and the device participates in the registration process with the foreign (roaming) network, the foreign network receives the enriched identifier, such as shown at step 700 in the process flow diagram of FIG. 7. Preferably, the enriched identifier has been passed with the service request in lieu of an identifier such as the MSISDN, or the like. At step 702, the foreign network uses the first part of the identifier (i.e. the portion associated with the home network service provider) to identify the mobile device user's home network or network provider.

As part of the registration process, the foreign network will use the enriched identifier to ask the device's home network about the types of services available for this device (e.g., roaming, message delivery, and the like). The HNP (based on its internal mapping of the obfuscated value to the known MSISDN), sends back one or more permissions. Based on one or more permissions, the FNP provides one or more of such services to the roaming device.

In particular, at step 704, the foreign network permits the requested access (or provides some other value-added service), based on a set of privileges asserted by the home network provider's identity. Step 704 may involve a local determination, or the foreign network provider may use an external device, server, proxy, entity, or service to make this determination. As noted above, however, the foreign network cannot decode the opaque portion of the enriched identifier; thus, the mobile device's identity (as well as the identity of the mobile device user) remains obscured and protected.

Thus, according to a preferred embodiment of the invention, a mobile device identifier (such as an MSISDN) that typically accompanies a mobile device request is replaced with an "enriched" identifier that exposes the mobile device user's home operator but obfuscates the mobile device's (and, thus, the device user's) identity. A first part of the enriched identifier comprises a data string that identifies (either directly or through a database lookup) the mobile device user's home operator. A second, opaque part of the enriched identifier obfuscates the mobile device's identity in a manner that preferably can be recovered only by the user's home operator (or an entity authorized thereby). When the mobile device user roams into a foreign network, that network receives the enriched identifier, preferably in lieu of an MSISDN or other identifier. The foreign network uses the first part to identify the mobile device user's home network but cannot determine the mobile device's identity. The user's privacy is maintained, and third parties are inhibited from building a profile of the device, e.g., based on the requests that include the MSISDN or similar identifier.

The present invention allows the subscriber to access resources from third party providers, whether the subscriber is on his or her home network or a foreign (roaming) network. The invention also allows providers (such as content provider web sites to which the subscriber may navigate) to easily determine the subscriber's home network; this enables such third parties to offer and provide value-added services. An example of one such value-added service would be an advertisement for a given product or service in a geographic area associated with the subscriber's home network.

Although third party providers and roaming operators do not know the identity of the mobile device or its user, these third parties may determine additional information about the subscriber by requesting information from the home network service provider. Such a request may be carried out using a shared alias (i.e., an alias shared between the home network service provider and such third party) that is generated within the context of a federated environment, such as described in U.S. Publication No. 2006/0021018, filed Jul. 21, 2004. As described in that document, a federated heterogeneous environment allows enterprises to provide a single-sign-on experience to a user. In such an environment, a user is able to authenticate to a first domain and then have that first domain provide the appropriate assertions to each downstream domain that might be involved in a transaction. These downstream domains need to be able to understand and trust authentication assertions and/or other types of assertions, even though there are no pre-established assertion formats between the first domain and these other downstream domains. In addition to recognizing the assertions, the downstream domains need to be able to translate the identity contained within an assertion to an identity that represents the user within a particular domain, even though there is no pre-established identity mapping relationship. In the alternative, the third party provider or operator obtains information about the subscriber from the home network service provider by using a request format such as that defined in the Web Services Trust Language (WS-Trust). Of course, any other convenient trust enforcing technology or protocol may be used.

Although the present invention has been described in the context of a mobile device user roaming from one 2.5 G network to another, the present invention is not limited for use in any particular type of wireless network. Indeed, the obfuscation techniques described herein may be used in any wireless networking environment in which a request for service may be accompanied with data associated with the mobile device or mobile device user. Thus, in a representative embodiment, the inventive technique can be used in any type of wireless network including, without limitation, analog cellular, digital cellular, Personal Communication System (PCS), Cellular Digital Packet Data system (CDPD), ARDIS, RAM Mobile Data, Metricom Ricochet, paging, and Enhanced Specialized Mobile Radio (ESMR). Exemplary communication protocols for wide area wireless networks include, without limitation, Time Division Multiple Access (TDMA, such as IS-136), Code Division Multiple Access (CDMA), 1xRTT, General Packet Radio Service (GPRS), Enhanced Data rates for GSM Evolution (EDGE), Global System for Mobile communications (GSM), Universal Mobile Telecommunications System (UMTS), and Integrated Digital Enhanced Network (iDEN) Packet Data. Moreover, the inventive technique may also be utilized in the unlicensed spectrum, such as wireless local area networks (WLANs) that conform to 802.11, HomeRF, Bluetooth, HiperLAN and the like.

The functionality provided at the home network or the foreign network as described herein may be implemented on any controller. A controller may be implemented in any convenient manner, such as a personal computer, a server, or similar machine. A representative controller is a rack-mounted PC running a Linux 2.4 (or equivalent) operating system kernel on a Pentium (or equivalent) processor, and the device includes system memory and external storage for supporting software applications and associated data. The controller also includes standard network interfaces to facilitate the functions described above. The controller typically exports a web-based (or equivalent) interface for administration, management and monitoring. Thus, in the context of the HNP, the controller is used for the UID-generation functionality.

Figure 8:
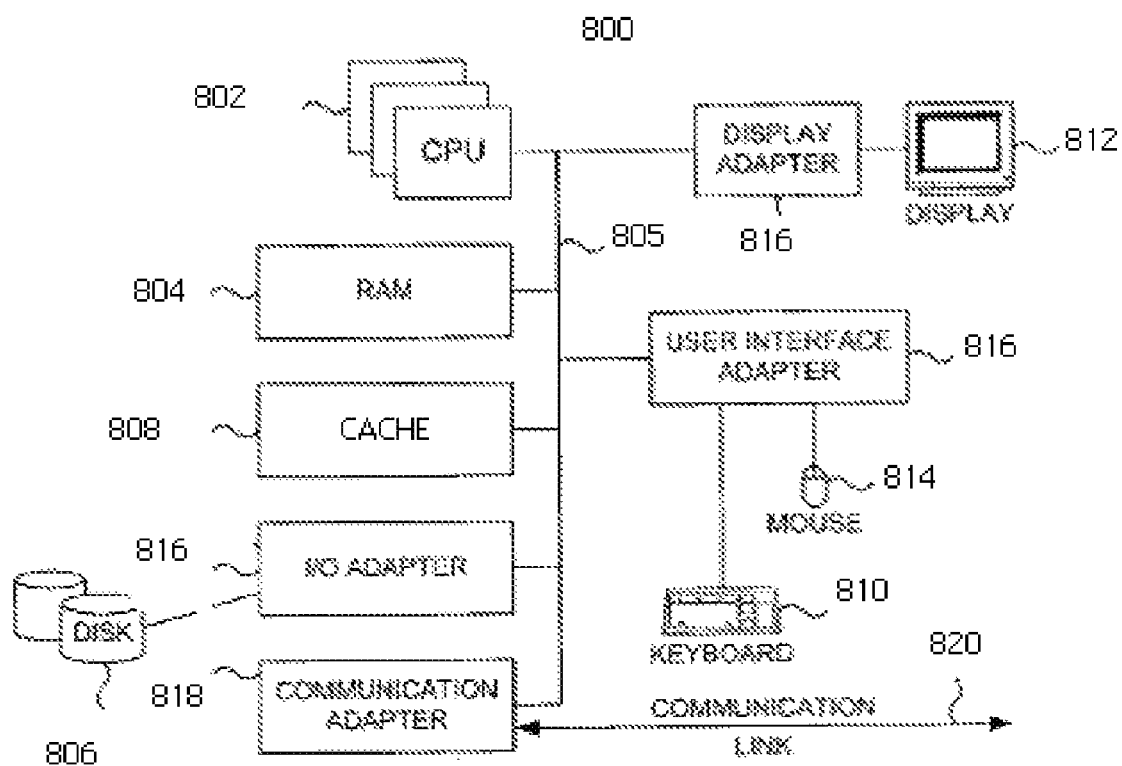
FIG. 8 is a data processing system for use in the present invention.

FIG. 8 is a representative data processing system that may be used for the controller described above. A data processing system 800 suitable for storing and/or executing program code will include at least one processor 802 coupled directly or indirectly to memory elements through a system bus 805. The memory elements can include local memory 804 employed during actual execution of the program code, bulk storage 806, and cache memories 808 that provide temporary storage of at least some program code to reduce the number of times code must be retrieved from bulk storage during execution. Input/output or I/O devices (including but not limited to keyboards 810, displays 812, pointing devices 814, etc.) can be coupled to the system either directly or through intervening I/O controllers 816. Network adapters 818 may also be coupled to the system to enable the data processing system to become coupled to other data processing systems or devices through intervening private or public networks 820.

One of ordinary skill will recognize that the mobile device itself comprises similar data processing components.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, as noted above, the invention can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions described may be combined or shared in given instructions, program sequences, code portions, and the like.

Having described our invention, what we now claim is as follows.

The invention claimed is:

1. Apparatus for use in a home network to which a plurality of mobile devices associate to receive a given mobile service, wherein each mobile device is provisioned with subscriber-specific information that identifies a user of the mobile device to the home network, comprising:
   a processor;
   a computer-readable medium comprising instructions executed by the processor for performing a method, comprising:
      generating an enriched identifier that, for a given mobile device of the plurality of mobile devices, obfuscates the subscriber-specific information except to an entity associated with the home network, the entity being a member of a set of entities associated with the home network, the set of entities being the only entities that can recover the subscriber-specific information from the obfuscation, the enriched identifier also including a data string from which an identity of the entity can be ascertained;
      providing the enriched identifier to the given mobile device; and
      responsive to an audit request, providing a validation that the enriched identifier was associated with the subscriber-specific information at a given time.

2. The apparatus as described in claim 1 wherein the enriched identifier is provided to the given mobile device in response in response to a request received from the given mobile device.

3. The apparatus as described in claim 1 wherein the request is a request to provision the subscriber-specific information in the given mobile device.

4. The apparatus as described in claim 1 wherein the request is a request to register the given mobile device in the home network.

5. The apparatus as described in claim 1 wherein the enriched identifier encodes the subscriber-specific information.

6. The apparatus as described in claim 1 wherein the enriched identifier is a function of the subscriber-specific information.

7. The apparatus as described in claim 6 wherein the function encrypts the subscriber-specific information, a timestamp, and a salt.

8. The apparatus as described in claim 7 wherein the salt is a secret shared by the mobile device and the home network.

9. The apparatus as described in claim 1 wherein the method includes the step of storing the unique identifier.

10. The apparatus as described in claim 9 wherein the method further includes generating a new enriched identifier, and providing the new enriched identifier to the given mobile device.

11. The apparatus as described in claim 1 wherein the method further includes receiving a service request that includes the enriched identifier, verifying that the enriched identifier is associated with the subscriber-specific information, and providing a response to the service request.

12. The apparatus as described in claim 11, wherein the service request is a request associated with a foreign network provider and the response to the service request is a given permission.

13. A method operative in a home network to which a plurality of mobile devices associate to receive a given mobile service, wherein each mobile device is provisioned with subscriber-specific information that identifies a user of the mobile device to the home network, comprising:
  for each mobile device of the plurality of mobile devices, generating an enriched identifier that obfuscates the subscriber-specific information except to an entity associated with the home network, the entity being a member of a set of entities associated with the home network, the set of entities being the only entities that can recover the subscriber-specific information from the obfuscation, the enriched identifier also including a data string from which an identity of the entity can be ascertained;
  providing the enriched identifiers to the mobile devices to enable the mobile devices to obtain services from one or more foreign networks with obfuscated user identities; and
  for at least one subscriber, and in response to an audit request, providing a validation that the enriched identifier provided to the mobile device for that subscriber was associated with the subscriber-specific information for that subscriber at a given time.

14. The method as described in claim 13 further including maintaining the enriched identifiers.

15. The method as described in claim 13 further including, for at least one subscriber, re-generating the enriched identifier and providing the re-generated enriched identifier to the mobile device associated with the at least one subscriber.

16. The method as described in claim 15 wherein the enriched identifier is re-generated periodically.

17. The method as described in claim 13 wherein, for a given subscriber, the enriched identifier is provided to the given subscriber's mobile device in response to a request received from the given subscriber's mobile device.

18. The method as described in claim 17 wherein the request is one of: a request to provision the subscriber-specific information in the mobile device, and a request to register the mobile device in the home network.

19. The method as described in claim 14 further including receiving, from a given mobile device, a service request that includes an enriched identifier, verifying that the enriched identifier is associated with the subscriber-specific information for the given mobile device, and providing a response to the service request.

20. The method as described in claim 19 wherein the service request is a request associated with a foreign network provider and the response to the service request is a given permission.

21. A method operative in a home network to which a plurality of mobile devices associate to receive a given mobile service, wherein each mobile device is provisioned with subscriber-specific information that identifies a user of the mobile device to the home network, comprising:
  for a given mobile device of the plurality of mobile devices, generating an enriched identifier that obfuscates the subscriber-specific information except to an entity associated with the home network, the entity being a member of a set of entities associated with the home network, the set of entities being the only entities that can recover the subscriber-specific information from the obfuscation, the enriched identifier also including a data string from which an identity of the entity can be ascertained;
  providing the enriched identifier to the given mobile device to enable the given mobile device to obtain services from one or more foreign networks with an obfuscated user identity;
  receiving, from the given mobile device, a service request that includes an enriched identifier;
  determining if the enriched identifier received is associated with the subscriber-specific information for the given mobile device,
  if the enriched identifier received is associated with the subscriber-specific information for the given mobile device, providing a response to the service request; and
  responsive to an audit request, providing a validation that the enriched identifier was associated with the subscriber-specific information at a given time.

22. The method as described in claim 21 wherein the service request is a request associated with a foreign network provider and the response to the service request is a given permission.

23. The method as described in claim 22 wherein the request associated with a foreign network provider is generated when the given mobile device roams from the home network to the foreign network associated with the foreign network provider.

* * * * *